United States Patent [19]

Shibata

[11] Patent Number: 5,136,702
[45] Date of Patent: Aug. 4, 1992

[54] BUFFER STORAGE CONTROL METHOD AND APPARATUS

[75] Inventor: Masabumi Shibata, Kawasaki, Japan
[73] Assignee: Hitachi, Ltd., Tokyo, Japan
[21] Appl. No.: 525,080
[22] Filed: May 17, 1990

[30] Foreign Application Priority Data

May 23, 1989 [JP] Japan .................................. 1-129864

[51] Int. Cl.⁵ .......................... G06F 9/00; G06F 15/00
[52] U.S. Cl. ..................................... 395/425; 364/239.7;
364/256.4; 364/256.5; 364/260.2; 364/963.2;
364/957.1
[58] Field of Search ....................... 364/200, 900, 300;
395/250

[56] References Cited

U.S. PATENT DOCUMENTS

| | | | |
|---|---|---|---|
| 3,902,163 | 8/1975 | Amdahl et al. | 364/200 |
| 4,700,291 | 10/1987 | Saito | 364/200 |
| 4,779,193 | 10/1988 | Koga et al. | 364/200 |
| 4,803,616 | 2/1989 | Uchiyama et al. | 364/200 |
| 4,890,220 | 12/1989 | Nakagawa et al. | 364/200 |

*Primary Examiner*—Michael R. Fleming
*Assistant Examiner*—Robert S. Hauser
*Attorney, Agent, or Firm*—Fay, Sharpe, Beall, Fagan, Minnich & McKee

[57] ABSTRACT

An information processing system includes a processor, a main storage, a buffer storage for holding a copy of a part of data of the main storage, an address translator for translating a logical address composed of a page address portion and an address portion within the page into a real address and a system controller and a buffer storage control unit. The buffer storage control unit includes a first detector and a second detector. The first detector detects presence or absence of a requested data in the buffer storage by using the real address obtained from making access to the buffer address array portion by using N bits of a part of the page address portion and the address portion within the page, and the real address obtained from the address translator and the second detector includes at least one address holding register for storing a real address of which data is not held in the buffer storage and detects presence or absence of the requested data in the buffer storage by using the contents of the address holding register and the real address obtained from the address translator in parallel with making access to the buffer address array portion.

8 Claims, 7 Drawing Sheets

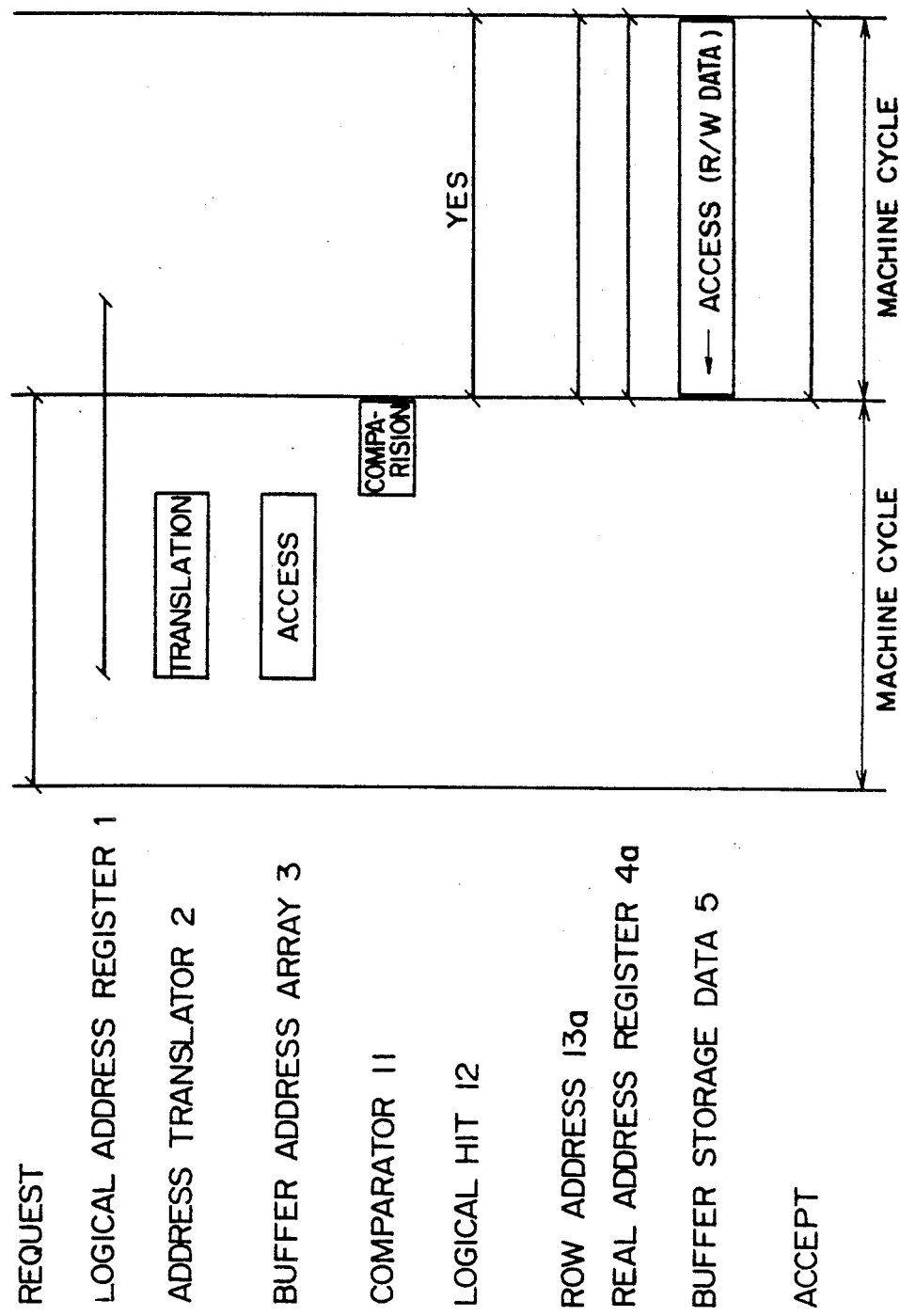

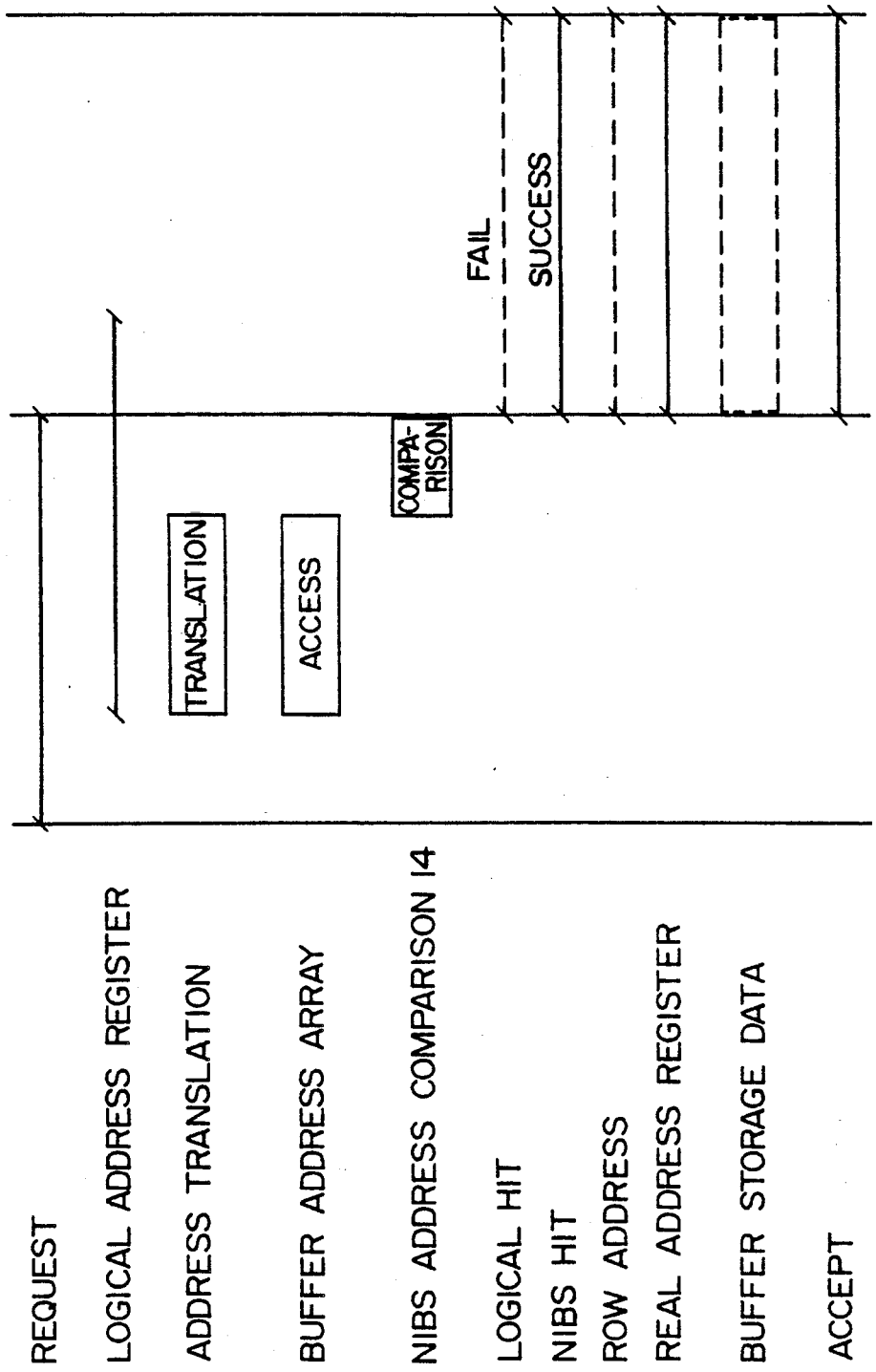

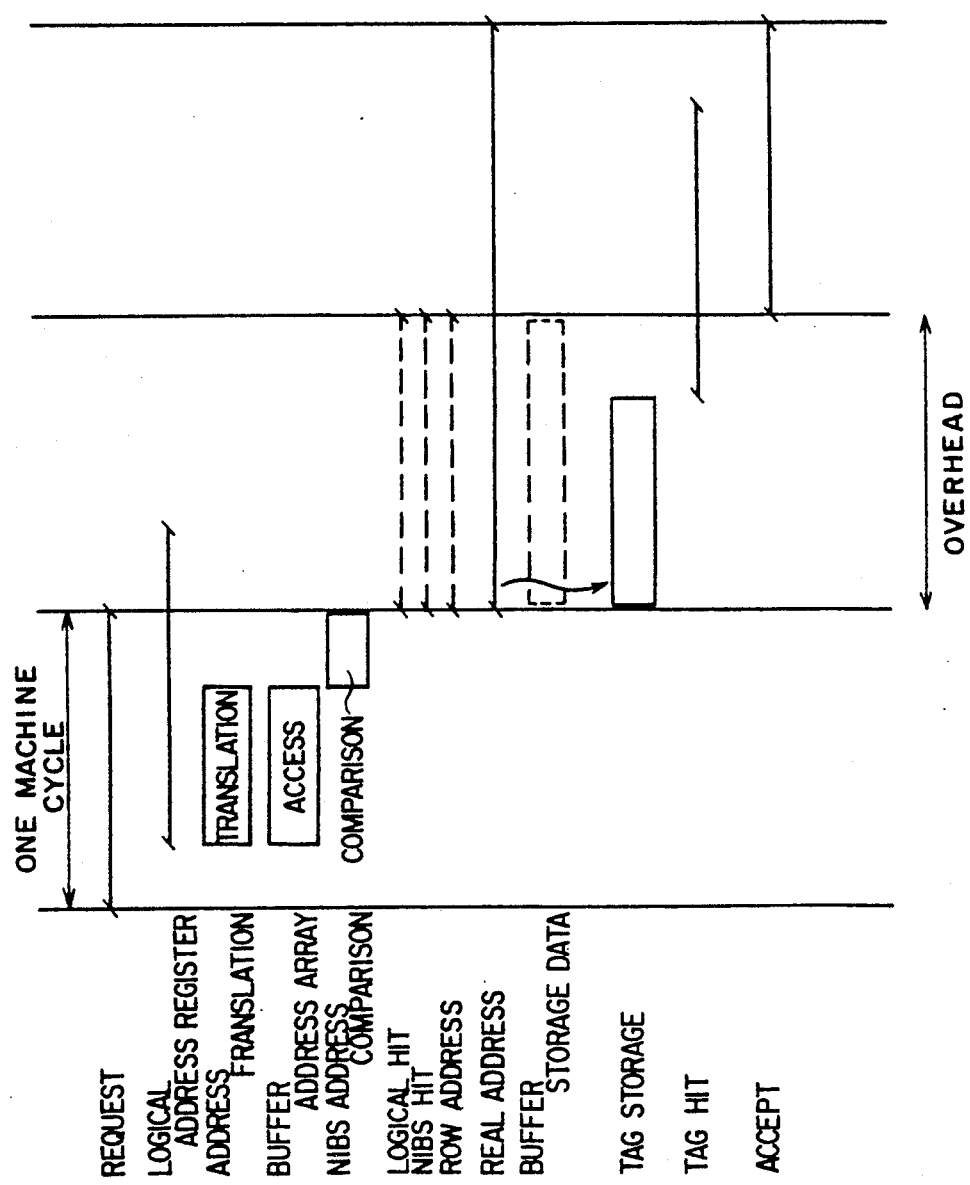

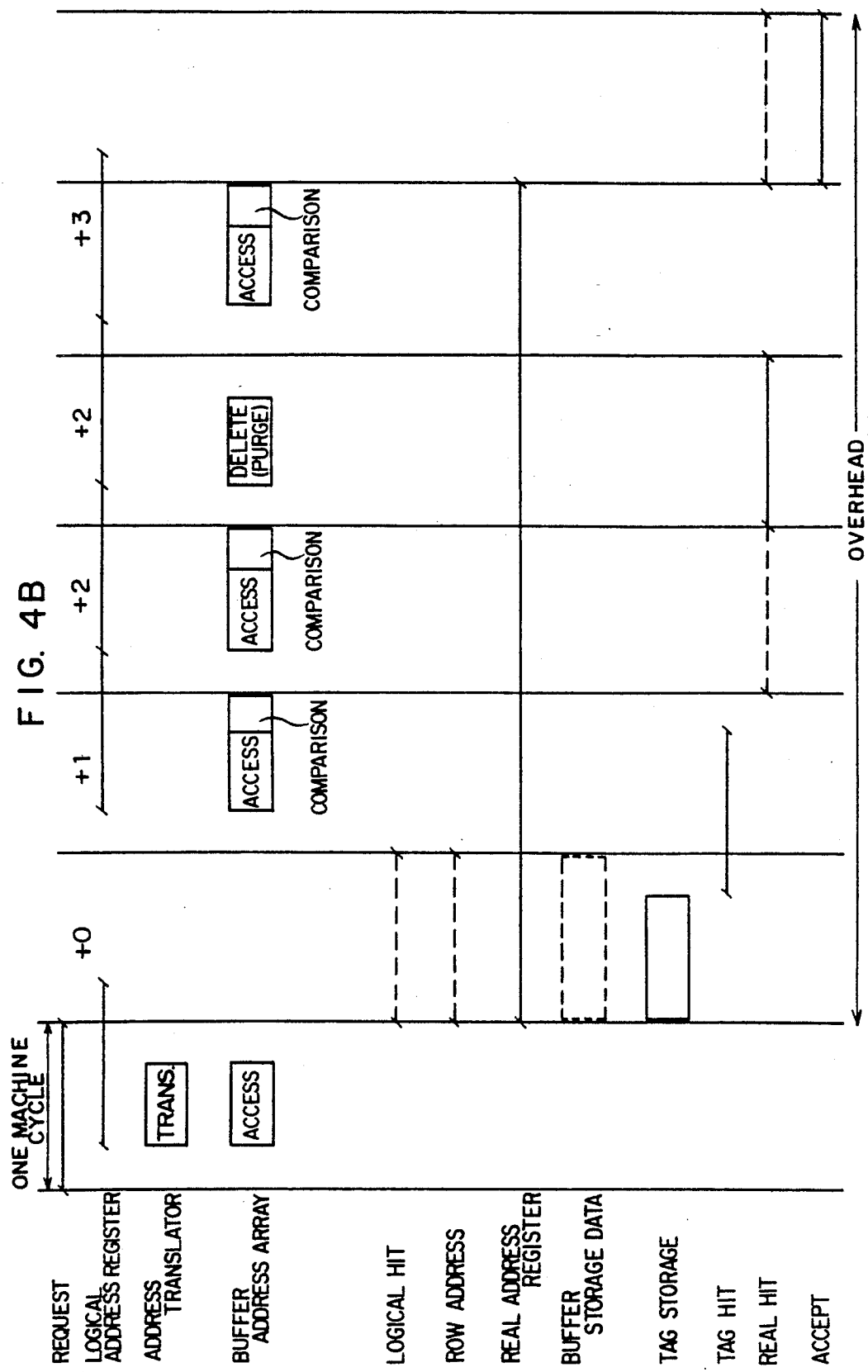

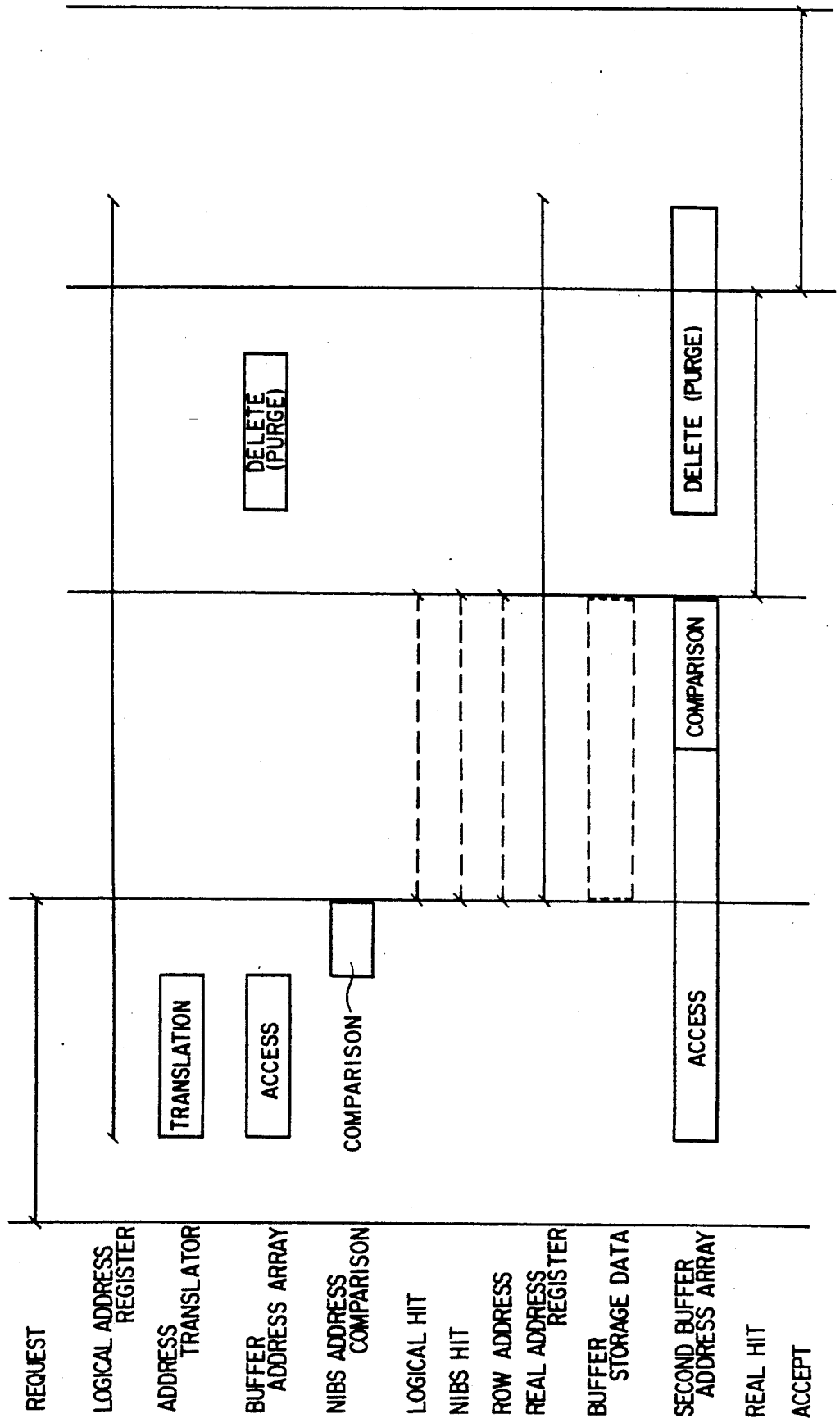

BUFFER STORAGE CONTROL METHOD AND APPARATUS

BACKGROUND OF THE INVENTION

The present invention relates to a buffer storage control technique, and, more particularly, to a buffer storage control apparatus and a buffer storage control method which are suitable for improving performance of an information processing system with storage hierarchy.

The relationships between access speed and cost, and between access speed and storage capacity, are important factors relating to the characteristics of a storage unit. It is generally known that the higher the operating speed of a storage unit, the higher the cost of this unit and that the lower the operating speed by a storage unit, the larger the storage capacity of the unit.

Therefore, in constructing a main storage of a relatively large capacity in an information processing system, such as a general purpose computer, for example, there is a limit to a realizable access speed because of the cost of the storage unit. As a result, a difference occurs in the access speed between a register storage of an extremely high operating speed within a central processing unit and the main storage. In this state, the operating speed of the central processing unit is restricted by the operating speed of the main storage.

On the other hand, because of the known characteristic of reference locality, there is a limit to the range of data that is accessed at one point of time among the total data that is stored in a large capacity main storage. Generally, the above problem is avoided by using the advantage of this characteristic to form a storage hierarchy in such a way that a buffer storage, the capacity of which is smaller than that of a main storage but the operating speed of which is higher than that of the main storage and is close to the operation speed of a central processing unit, is provided between the main storage and the central processing unit. Further, a data to which access is estimated to be made is copied in advance from the main storage to the buffer storage; and a higher buffer storage is accessible to the central processing unit.

In a storage hierarchy as described above, increasing the capacity of the buffer storage is advantageous in improving the performance of the central processing unit in that the probability that data required by the central processing unit exists in the buffer storage, or the hit ratio is increased. Also, the frequency of a low speed direct access to the main storage which takes time is reduced so that the instruction execution time in the central processing unit is reduced.

As one of method for making access from the central processing unit to the buffer storage, there is a so-called set-associative mapping method according to which a buffer storage is addressed with a few bits of a part of a logical address to thereby increase the speed of making an access to this buffer. In this method, however, in order to achieve the increase in the buffer storage capacity as described above, it is necessary to either (1) increase an address range for making access to the buffer storage (that is, number of columns which constitute the buffer storage) or (2) enhance the set associative mapping capability (that is, number of rows which belong to each column).

However, when the set associative mapping capability is improved, the frequency of comparison for checking all the rows which belong to the same column increases; So, there is a limit to the increase in the number of rows from the constraint of the cost due to the increase in the physical quantity of hardware.

In the information processing system which uses a virtual storage system, when the buffer storage capacity is increased, it becomes necessary that the address range for making access to the buffer address array, which stores a part of the logical address and a real address of the buffer storage by corresponding to each other, is expanded to a page address portion which needs a virtual-to-real address translation. Address translator only occurs in excess of the address portion within a page in which translation of the logical address is not necessary. In other words, since the buffer storage is managed by the real address, in order to make an access to the buffer address array with the real address, it is necessary to use a procedure for obtaining a real address from the logical address by using an address translator. Thus, problem of increasing a redundant time (overhead) from the point at which the logical address of a target data is established to the point at which the buffer storage is accessed.

Therefore, it has been a conventional practice to access a buffer address array in the form of a logical address in order to increase the capacity of a buffer storage.

When accessing of a buffer address array with a logical address, the access address used is comprised of 1.) (N: a positive integer) of a part of the page address portion; and, 2.) the address portion within the page. Since a logical address is different from a real address at the page address portion, it becomes possible that a certain real address is entered in $2^N$ entries (classes) of the buffer address array. When the real address which has been obtained from accessing the buffer address array by using 1.) the N bits of the page address portion and 2.) the address portion within the page which matches the real address which has been obtained from an address translation means, it is judged that the target data exists in the buffer storage (this is referred to as "logical hit").

On the other hand, in the case of no logical hit, it is necessary to make access to other classes of the buffer address array and decide whether there is a real address which matches with the real address in the other classes (this is referred to as "real hit") or there is no real address which matches the real address in the other classes (this is referred to as a not-in-buffer storage which is hereinafter abbreviated as "NIBS").

There are some examples of methods of detecting a real hit as follows.

(1) When there is no logical hit, the N bits of the page address portion are sequentially changed to make access to the buffer address array, and it is determined whether the obtained real address is matched with the target address or not. According to this method, it takes a long time to detect a real address when there are many classes. As a countermeasure for this, the time required for detecting a real address is reduced by providing a tag storage which is accessed by a real address and has information as to presence or absence of data of the real address in the buffer storage, as disclosed in the Japanese Patent Laid-Open JP-A-6280742, for example.

(2) All the classes of the buffer address array are read out simultaneously by using the address portion within the page, and judgement is made about the case of a real address whether it is a logical hit, a real hit, a not-in-buffer storage. In this case, since it is necessary to compare real addresses of all the classes, the probability is high that the time required for the detection will become long as compared with the time required for detecting logical hit only.

According to the above-described prior art techniques, there is a problem in all cases in that a increased time is required to detect real hit when there is no logical hit in accessing the buffer storage.

In other words, in the case of the abovedescribed prior art method (1), it is necessary to make access to all the other classes of the buffer address array in order to detect a real hit. It is also necessary to make access by a maximum $2^N-1$ times when the page address used for making access to the buffer address array has N bits. In the case where a tag storage is introduced to reduce the number of access times, it becomes necessary to make access to all the other classes of the buffer address array only when the tag storage is hit, of which the probability is small. However, since it is necessary to make access to the tag storage with a real address, it becomes essential that the real address is obtained from an address translation means. As a result, it becomes necessary to take additional time by the time required for making access to the tag storage in comparison with the case where there exists logical hit.

Further, in the case of the above-described prior art method (2), it is necessary to make access to all the classes of the buffer address array and use a comparing means is necessary to compare real addresses of all the classes. Therefore, for example, when a logical hit detecting means is separated from a real hit detecting means because of constraints in mounting these means, the real hit detecting time is extremely slow compared with a logical hit detecting time. In this case, additional time is necessary for making access to the buffer storage when there is no logical hit, which may increase the time for executing an instruction in the central processing unit.

SUMMARY OF THE INVENTION

It is an object of the present invention to provide a method and an apparatus for buffer memory control which can reduce time required for detecting a real hit or making necessary decisions in the case of no logical hit at the time of a high-speed access to a buffer storage.

It is another object of the present invention to provide a method and an apparatus for buffer control which can realize reduction in an average time for executing an instruction in an information processing unit having a buffer storage.

In order to achieve the above object in an information processing system which includes a main storage, a buffer storage for copying a part of the data of the main storage, a buffer address array portion for holding real addresses in the main storage of data held by the buffer storage and an address translation means for translating a logical address including a page address portion and an address portion within a page into a real address, a buffer storage control apparatus in accordance with one of the features of the present invention is provided. The buffer storage control apparatus includes first detecting means and second detecting means. The first detecting means detects the presence or absence of requested data in the buffer storage by using a real address obtained from the address translation means and a real address obtained from making access to the buffer address array portion by using N bits of a part of the page address portion and the address portion with the page; The second detecting means includes at least one address hold register for storing a real address of which is not held in the buffer storage and detecting presence or absence of requested data in the buffer storage by using a real address obtained from the address hold register and the address translation means in overlapped manner with the access to the buffer address array portion. Further in the case where it has been detected by the first detecting means that the requested data does not exist on the buffer storage and it has not been detected by the second detecting means that the requested data does not exist on the buffer storage, the buffer address array portion is accessed with regard to combinations of N bits of the page address portion and presence or absence of requested data in the buffer storage is detected.

In accordance with the above-described buffer storage control apparatus of the present invention, in an information processing system for controlling the buffer storage in such a way that, for example, the data held in the buffer storage is selectively registered in a class of logical hit and the data registered in other classes of no logical hit is deleted in order to have a high probability of logical hit thereby to increase the speed of making access to the buffer storage, a decision of logical hit by the first detecting means by using a real address obtained from the logical address through the address translation means and a decision of real hit by the second detecting means by comparing the contents of the address hold register and the real address are made in parallel or in overlapped manner. Therefore, a result of the decision of real hit in the case of no logical hit can be obtained without an overhead so that the time required for making judgement of real hit in the case of no logical hit can be reduced.

By the above-described arrangement, when there is no logical hit, such as in the operation of writing data from the central processing unit to the buffer storage, for example, presence or absence of real hit is checked. When it is necessary to write data in the class of a real hit or delete an existing data, the problem of delay in processing attributable to the time required to detect a real hit is solved, so that it becomes possible to realize reduction of an average time required to execute an instruction in the information processing unit which has a buffer storage.

BRIEF DESCRIPTION OF THE DRAWINGS

FIG. 2 is a timechart for explaining one example of control operation of the structure shown in FIG. 1;

FIG. 3 is a timechart for explaining one example of the control operation of the same;

FIGS. 4A and 4B are timecharts for explaining one example of the control operation of the present embodiment and a conventional example of the control operation, respectively;

FIG. 6 is a timechart for explaining one example of the control operation of the apparatus of the embodiment shown in FIG. 5.

DESCRIPTION OF THE PREFERRED EMBODIMENTS

A buffer storage control system in one embodiment of the present invention will be explained in detail with reference to the drawings.

Figure 1:
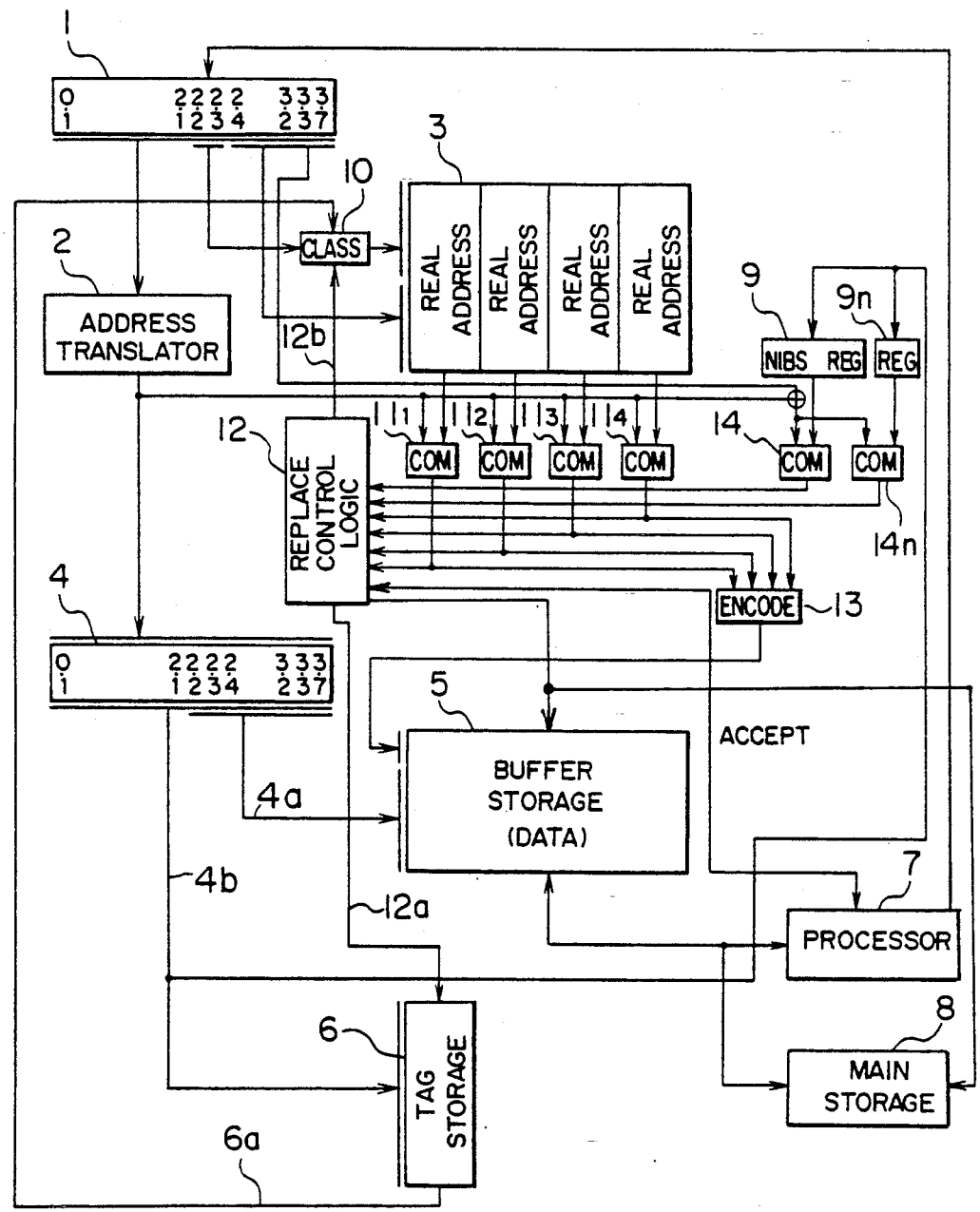
FIG. 1 is block diagram showing a main portion of the structure of an information processing unit in which buffer storage control of a first embodiment is carried out.

FIG. 1 shows a main portion of the structure of the information processing system in which the buffer storage control of the present invention is carried out.

The information processing system of the present embodiment shown in FIG. 1 comprises a processor such as a central processing unit including an arithmetic or logical unit 7, a main storage 8 of relatively large capacity which stores information such as a program for controlling execution of a predetermined processing in the control processing unit and data to be processed, and a buffer storage 5 which exists between the main storage 8 and the central processing unit and which has a capacity smaller than that of the main storage 8 but can make access at a higher speed than the main storage 8.

Of the information stored in the main storage 8, the information which has a high probability of being accessed from the central processing unit 7 is copied in a buffer storage 5 of a higher processing speed, and the central processing unit transmits and receives information such as an instruction which organizes a program and data which is to be processed, to and from the buffer storage 5 based on the control to be described later.

Around the buffer storage 5, there are provided a logical address register 1 in which a logical address issued from the central processing unit 7 is set in making access to the buffer storage 5, a real address register 4 which holds a real address translated from a logical address through an address translator 2, a buffer address array 3 which collectively manages real addresses corresponding to individual data in a manner described later in order to increase the speed of making access to the data stored in the buffer storage 5, comparators $11_1$, $11_2$, $11_3$ and $11_4$ which compare a real address selected from the buffer address array 3 with a real address obtained from the address translator 2, a replace control logic 12 which judges presence or absence of a target data in the buffer storage 5 based on a result of the comparison, and an encoder 13 which obtains a row number to be described later at the time of logical hit.

In the present embodiment, a logical address to be set to the logical address register 1 is expressed by 31 bits from the first bit of the 0-th byte (0, 1) to the seventh bit of the third byte (3, 7), and the bit (0, 1) to the bit (2, 3) form a page address which needs to be translated into a real address (a change address portion) and the bit (2, 4) to the bit (3, 7) form an address within a page which is common to a real address and does not need to be translated (an unchanged address portion).

In this case, the buffer address array 3 is addressed by two bits from the bit (2, 2) to the bit (2, 3) of the page address of the logical address given through a class converter 10 and seven bits from the bit (2, 4) to the bit (3, 2) of the address within the page, and the four rows are accessed simultaneously.

Of the address within the page, five bits from the bit (3, 3) to the bit (3, 7) indicate an address within the block, and the data to be stored in the buffer storage 5 is copied in advance in this block unit (32 bytes) from the main storage 8.

In the present embodiment, a tag storage 6 is also provided which is addressed by a real address of the real address register 4 and stores information pertaining to presence or absence of data in the buffer storage 5 corresponding to the real address. In the case where logical hit is not detected in a replace control logic 12, this tag storage 6 is referred to. When there is hit in the tag storage 6, the class converter 10 is sequentially operated to sequentially change classes that are expressed by combinations of two bits from the bit (2, 2) to the bit (2, 3) of the logical address given from the logical address register 1, and a real address is read out from the buffer address array 3, so that the real address is compared in repetition by the plurality of comparators $11_1$ to $11_4$ with a real address after translation by the address translator. In the structure of FIG. 1, unlike the illustration in the drawing, it is also possible to apply the real address direct to the input side of the real address register 4, including the real address which is obtained by translating the address of the bits (0, 1) to (2, 3) of the page address portion from the logical address register 1 and the real address portion of the bits (2, 4) to (3, 7) of the address portion within the page of the logical address register 1.

In the present embodiment, there are also provided a NIBS address register 9 which holds a real address set in the real address register 4 of data that has been judged to be in neither a logical hit nor a a real hit, that is, data that has been judged to be held nowhere in the buffer storage 5, and a comparator 14. In other words, a real address (bits (2, 2) to (3, 2)) of the case when it has been detected that there is no real hit is set in the NIBS address register 9. The real address held in the NIBS address register 9 is compared with a sum of the real address obtained from the address translator 2 and the address portion within the page by the comparator 14, in parallel with the access to the buffer address array 3 for the detection of a logical hit. A result of the comparison is applied to the replace control logic 12. In the following explanations, a match of real addresses as a result of a comparison by the comparator 14 is expressed as "NIBS hit".

Operation of the present embodiment will be explained below.

An access from the central processing unit to the buffer storage 5 is started by setting a logical address in the logical address register 1.

Of the logical address set in the logical address register 1, a page address is translated into a real address through the address translator 2, and the real address after the translation and an address within the page are transferred, as they are, to the real address register 4.

When the logical address register 1 (is requested, at the same time, the buffer address array 3 is retrieved which uses the bits (2, 2) to (2, 3) belonging to the page address and the bits (2, 4) to (3, 2) belonging to the address within the page, of the logical address that has been set in the logical address register 1. The corresponding real address is outputted to the comparator 11 by four rows at the same time, and the real address from the buffer address array 3 is compared with the real address obtained through the address translator 2, and the real address obtained from the address translator 2 is compared with the real address held in the NIBs address register 9 by the comparator 14. Results of comparison by the respective comparators are sent to the replace control logical circuit 12.

When only one of the comparators $11_1$ to $11_4$ matches, that is, when only one row within the four rows of the buffer storage 5 shows hit, this becomes logical hit, which accordingly confirms that a requested data assigned by a logical address set in the logical address register 1 exists in the buffer storage 5. In this case, as shown in the timechart of FIG. 2, a row number obtained from the output of the comparators $11_1$ to $11_4$ through an encoder 13 is applied as one input and a part of the page address set in the real address register 4 and the address within the page are applied as another input 4a to make access to the buffer storage 5. A target request data obtained as a result is transferred to the arithmetic or logical unit of the processor 7.

On the other hand, when it is made clear by the inspections by the comparators $11_1$ to $11_4$ that there is no real hit and also when the real address held in the NIBS address register 9 matches the real address obtained through the address translator 2 in the comparator 14, that is, when there is NIBS hit, it immediately becomes clear that a target requested data does not exist in either the buffer storage 5 or the other classes. As a result, it becomes unnecessary to carry out a redundant checking of real hit, as shown in the timechart of FIG. 3.

When there is no logical hit in the comparators $11_1$ to $11_4$ and there is no NIBS hit, the tag storage 6 is accessed by a real address of the real address register 4 by an instruction from the replace control logic 12 and presence or absence of the data of the real address in the buffer storage 5 is checked, as shown in the timechart of FIG. 4A.

When existence of a target data in the buffer storage 5 is made clear by the information of the tag storage 6, that is, when there is a tag hit, detection of a real hit is started. In other words, the class converter 10 is operated by an instruction 6a from the tag storage 6 to sequentially change classes that can be expressed by two bits of the bits (2, 2) to (2, 3) of the logical address that is given to the buffer address array 3, thereby to make access to the buffer address array 3. A real address obtained is compared in repetition of the comparators $11_1$ to $11_4$ with a real address obtained through the address translator 2. When a real address which matches the real address is found, there is a real hit, and the entry of the buffer storage 5 is deleted. This deletion is carried out in order to avoid such a situation, because of the fact that the data is stored in the position of a real hit, a registration to a position of a logical hit to which a high-speed access is possible is interrupted when the data is to be copied from the main storage 8 to the buffer storage 5.

Further, when there is no tag hit as a result of making access to the tag storage 6, target data does not exist in the buffer storage 5. Therefore, a real hit is not detected in this case. However, in this case, overhead occurs by a time required to make access to the tag storage 6 as compared with the case where there is logical hit or NIBS hit. FIG. 4B shows a timechart of the operation according to the prior art which indicates that the overhead is larger than that of the timechart in FIG. 4A.

Registration of a real address in the NIBS address register 9 is carried out by updating the data in the case where no real hit has been detected, that is, in the case where there exists no data corresponding to the real address in the buffer storage 5. The real data registered in the NIBS address register 9 is deleted when the data corresponding to the real address has been copied from the main storage 8 to the buffer storage 5.

As described above, in the case of the present embodiment, it is possible to immediately detect that there is no real hit when there is no logical hit, without overhead of an access to the tag storage 6 by a real address, by storing in advance the real address of neither logical hit nor real hit in the NIBS address register 9 and by judging whether or not the real address obtained from the address translator 2 matches the real address stored in the NIBS address register 9 in the comparator 14, in parallel with the retrieval of the buffer address array 3.

Accordingly, when writing of data in a continuous address occurs, in the case of the present embodiment, it becomes possible to reduce the time required to make access to the buffer storage 5 by the portion of time for detecting real hit because the operation of detecting real hit occurs only in the initial writing and, thereafter, writing can be done without overhead of detection of a real hit, as compared with the conventional method according to which a redundant operation of detecting a real hit is necessary for each writing unit (block) if the data has not been stored in the buffer storage 5.

By the above-described arrangement, the time for executing an instruction accompanying data transmission to and receiving from the buffer storage 5 can be reduced, which improves performance of the information processing system.

Figure 5:
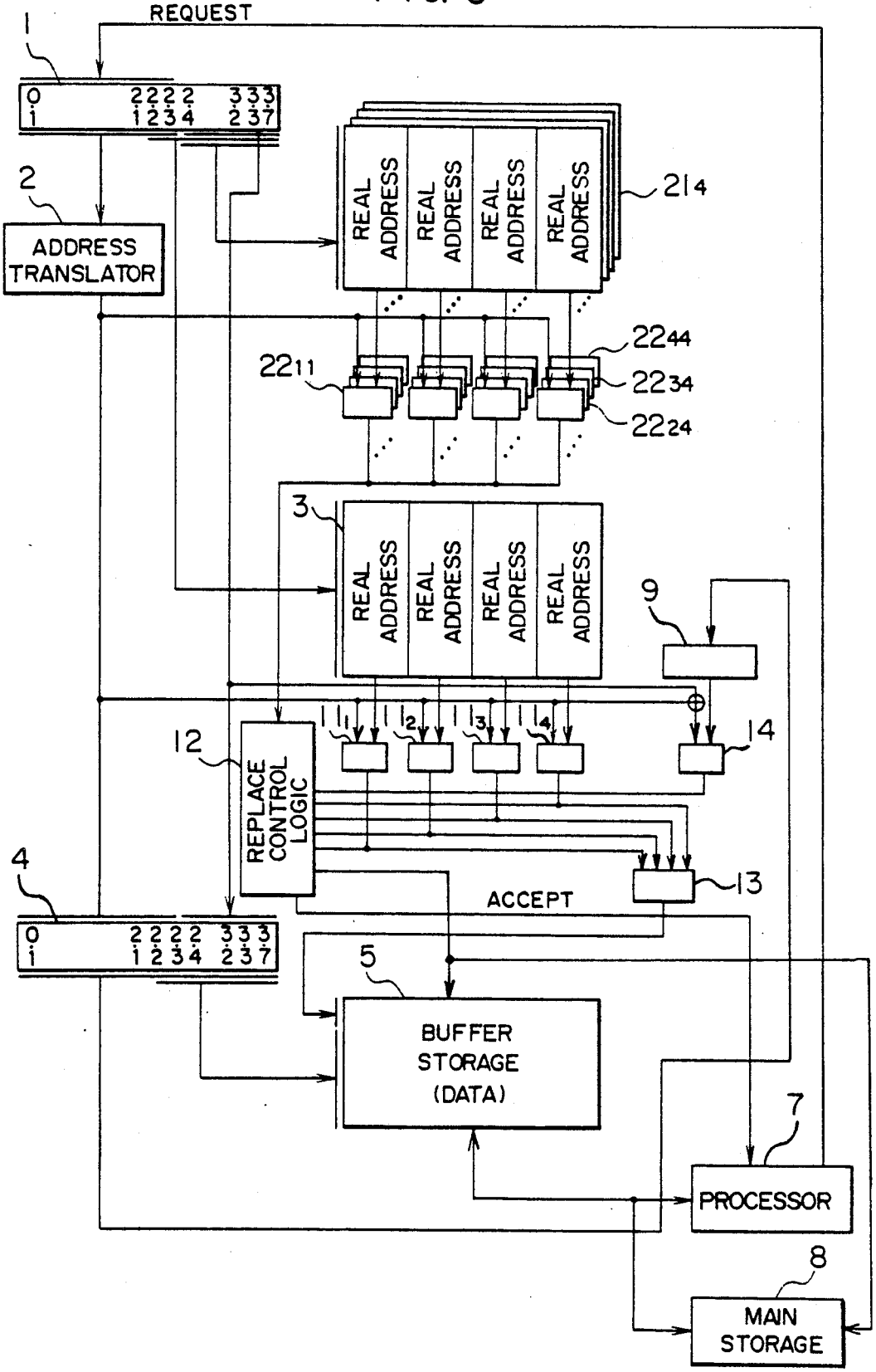
FIG. 5 is a block diagram showing a main portion of the structure of the information processing system in which buffer storage control according to another embodiment of the present invention is carried out.

FIG. 5 shows a structure of the information processing system in which the buffer storage control in another embodiment of the present invention is executed, and FIG. 6 shows one example of the operation thereof.

The second embodiment has the same functions as those of the first embodiment at portions of the same reference symbols, except for second buffer address arrays $21_1$ to $21_4$ and a plurality of comparators $22_{11}$ to $22_{44}$ accompanying these second buffer address arrays are provided instead of the tag storage 6 in the first embodiment.

The second buffer address arrays $21_1$ to $21_4$ are accessed when there is neither logical hit nor NIBS hit.

The second buffer address arrays $21_1$ to $21_4$ hold the contents which are the same as those of the buffer address array 3. The second buffer address arrays $21_1$ to $21_4$ are accessed by only the address within the page of the logical address that has been set in the logical address register 1, and it is possible to simultaneously access $2^N$ entries corresponding to N bits of the page address portion. A plurality of real addresses that are obtained simultaneously at the time of making access to the second buffer address arrays $21_1$ to $21_4$ by the address within the page are simultaneously compared, in the plurality of comparators $22_{11}$ to $22_{44}$ corresponding to the number of entries, with a real address obtained from the address translator 2, and the result is transmitted to the replace control logic 12.

When there exists a target data in the buffer storage 5 as a result of the comparison, there is real hit, and the corresponding entry is deleted accordingly.

In the case of the second embodiment, in detecting real hit which is necessary when there is neither logical hit nor NIBS hit, it is possible to reduce the time required to detect real hit by the portion of time when a plurality of entries (classes) can be simultaneously accessed in the second buffer address array 21, as compared with the case of the first embodiment where retrieval is repeated by sequentially changing classes to be given to the single buffer address array 3 based on the instruction from the tag storage 6.

FIGS. 7a and 7b are provided as operational flowcharts illustrating the embodiment shown in FIG. 1. Similarly, FIGS. 8a and 8b are provided as operational flowcharts associated with the apparatus of FIG. 5. FIGS. 9a and 9b simply illustrate certain operations utilized in both embodiments after a determination of whether data is stored in the buffer storage. The process of FIGS. 9a and 9b is well known in the art although limited to store-through control type system.

The present invention has been described above in detail by way of the embodiments. However, it is needless to mention that the present invention is not limited to the above-described embodiments and various modifications can be made within the range of the gist of the invention.

For example, the storage hierarchy to which the buffer storage control system of the present invention is applied is not be limited to the structure of the central processing unit, buffer storage and main storage, but this may also be applied to a lower storage hierarchy as well.

Further, it goes without saying that the structure of each portion of the information processing unit is not limited to the ones indicated in the above embodiments.

What is claimed is:

1. A buffer storage control unit in an information processing system which includes a main storage having data stored therein, a buffer storage for holding a copy of a part of the data of said main storage, a buffer address array portion for holding a first real address of said main storage of the data held by said buffer storage and address translation means for translating a logical address including a first address portion which is different from the first real address and which changes during an address translation and a second address portion which is equal to the first real address and does not change during the address translation, the buffer storage control unit comprising:

first detecting means for detecting one of a presence and an absence of a requested data in the buffer storage by comparing the first real address obtained by making access to the buffer address array portion by using N bits of a part of said first address portion and said second address portion with a second real address obtained by said address translation means;

second detecting means, including at least one address hold means for holding a third real address of data which is preset in the address hold means and indicates that the third real address is not held in the buffer storage and means for comparing the third real address of the address hold means with the second real address obtained from the address translation means, for detecting one of the presence and the absence of the requested data in the buffer storage while making access to the buffer address array portion; and, detection control means for providing the buffer storage array portion with access signals representing combinations of the N bits when said first detecting means has detected the absence of requested data in said buffer storage and also when said second detecting means which operates in parallel with said first detecting means has detected possible presence of the requested data in said buffer storage wherein, in response to detection of a real address mis-hit representing the absence of said requested data as a result of hit searching by said buffer address array and said first detecting means, said detection control means updates the at lest one address hold means to store therein the mis-hit real address of said requested data, as the third real address.

2. The buffer storage control unit according to claim 1, further comprising third detecting means accessed by the second real address, including a tag storage which holds information pertaining to one of the presence and the absence of the requested data of said main storage, corresponding to the second real address, in the buffer storage, for detecting whether the requested data exists in the buffer storage based on the information held by the tag storage wherein said detection control means further includes means for responding to the first detecting means detecting the absence of the requested data in said buffer storage and also said second detecting means detecting the presence of the requested data in said buffer storage by instructing said third detecting means to check one of the presence and the absence of the requested data in the buffer storage before providing the combinations and further wherein when the presence of the requested data is detected by the third detecting means the buffer address array portion is accessed for the combinations of the N bits of the first address portion.

3. The buffer storage control unit according to claim 1, wherein said first and second address portion respectively include a page address portion and an address portion within a page, said address hold means includes an address information holding register for holding information of at least the one third real address of data which is preset and indicates that the third real address is not held in said buffer storage, and said detection control means includes means for sequentially accessing the buffer address array portion for all the combinations of the N bits of the first address portion in response to a result of said first and second detecting means.

4. A buffer storage control unit in an information processing system which includes a main storage, a buffer storage for holding a copy of a part of data of the main storage, first and second buffer address array portions for holding first real addresses of the main storage of said data held by the buffer storage and an address translations means for translating a logical address comprised of a first address portion which is different from each of the first real addresses and changes during address translation and a second address portion which is equal to one of the first real addresses and does not change, the buffer storage control unit comprising:

first detecting means for detecting one of a presence and an absence of a requested data in the buffer storage by comparing a one first real address obtained by making access to the first buffer address array portion by using N bits of a part of said first address portion and said second address portion with a second real address corresponding to said logical address of the requested data obtained by the address translation means;

second detecting means including at least one address hold means for holding a third real address preset in the address hold means and indicating that the third real address is not held in the buffer storage and comparing the third real address of the address hold means with the second real address obtained from the address translation means, for detecting one of the presence and the absence of the requested data in the buffer storage in parallel with making access to the buffer address array portion;

third detecting means, including means for accessing the second buffer address array portion by overlapping $2^N$ entries corresponding to the N bits of the first address portion using the second address portion, and comparing $2^N$ third real addresses obtained by said accessing with the second real address obtained from the address translation means, for detecting one of the presence and the absence of the requested data in the buffer storage; and, detection control means for controlling said buffer storage control unit such that when said first detecting means has detected that the requested data does not exist in said buffer storage and also when said second detecting means has not detected that the requested data does not exist in said buffer storage, said detection control means updates said at least one address hold means to hold the real address of said requested data for searching of a subsequent requested data.

5. A method for controlling a buffer storage in an information processing system which includes a processor, a main storage having data stored therein, a buffer storage for holding a copy of a part of the data of the main storage, a buffer address array portion for holding a first real address of the data held by the buffer storage in the main storage, an address translation unit for translating a logical address comprised of a first address portion which is different from a first real address component and a second address portion which is equal to the first real address component into a second real address, the method comprising steps of:

first detecting one of a presence and an absence of a requested data in the buffer storage by a first detector by comparing the first real address obtained by making access to the buffer address portion by using N bits of a part of said first address portion and said second address portion with a second real address obtained from said address translation unit;

controlling acceptance by a control means of a request for data to the processor which makes access to the buffer storage and issues the request for data, based on the first detecting;

second detecting one of the presence and the absence of the requested data in the buffer storage in parallel with the first detecting by a second detector including at least one address hold means for holding a third real address of data which is predetermined not to be held in the buffer storage by comparing the third real address of the address hold means with the second real address obtained from the address translation unit; and third detecting of one of the presence and the absence of the requested data in the buffer storage by making access to the buffer address array portion for different combinations of the N bits of the first address portion in response to the first detecting of the absence of data and the second detecting of the presence of data, so that the result of the detection is applied as an input for controlling said control means.

6. The method according to claim 5, further comprising updating by the control means said address hold means of the second detector each time any request for data is issued from said processor.

7. A method for accessing a buffer storage in an information processing system including a processor, a main storage having data stored therein, a buffer storage which stores a copy of a part of the data, a buffer storage control unit, a buffer address array portion for holding real addresses of the part of the data stored in the buffer storage, and a not in buffer storage register which holds information corresponding to other parts of the data which are not stored in the buffer storage, the method comprising steps of:

issuing by the processor a logical address including a real address portion and a class designator;

first determining by the buffer storage control unit whether the buffer address array portion includes the logical address by detecting one of a logical hit in a class of the part of the data and a mis-hit using the real address portion and the class designator;

second determining by the buffer storage control unit whether the logical address is included in the not in buffer storage register by detecting a "not in buffer storage" state or a nondetermination of the "not in buffer storage" state using the real address portion; and, searching other classes of data stored in the buffer storage by using other class designators in response to detections of the mis-hit and the nondetermination, wherein when the logical hit or the "not in buffer storage" state is detected, said buffer storage control unit terminates said searching on all the remaining classes of addresses in the buffer address array portion and instructs the processor to access the main storage.

8. The method of claim 7 wherein the first determining and the second determining occur in parallel fashion.

* * * * *